May 17, 1966 J. W. VEIGL 3,251,949

INTERGROUP TRANSFER CIRCUIT

Filed Oct. 8, 1962 10 Sheets-Sheet 1

INVENTOR
J. W. VEIGL
BY Howard R Popper
ATTORNEY

May 17, 1966 J. W. VEIGL 3,251,949

INTERGROUP TRANSFER CIRCUIT

Filed Oct. 8, 1962

10 Sheets-Sheet 2

May 17, 1966 J. W. VEIGL 3,251,949

INTERGROUP TRANSFER CIRCUIT

Filed Oct. 8, 1962 10 Sheets-Sheet 3

INTERGROUP TRANSFER CIRCUIT

Filed Oct. 8, 1962

INTERGROUP TRANSFER CIRCUIT

Filed Oct. 8, 1962

May 17, 1966 J. W. VEIGL 3,251,949

INTERGROUP TRANSFER CIRCUIT

Filed Oct. 8, 1962 10 Sheets-Sheet 7

United States Patent Office 3,251,949

Patented May 17, 1966

3,251,949

INTERGROUP TRANSFER CIRCUIT

John W. Veigl, Franklin Square, N.Y., assignor to Bell Telephone Laboratories, Incorporated, New York, N.Y., a corporation of New York Filed Oct. 8, 1962, Ser. No. 228,859

18 Claims. (Cl. 179—27)

This invention relates to telephone switching systems and more particularly to call transfer arrangements in large private branch exchanges.

In the copending applications of O. H. Williford and V. J. Matthews, respectively bearing Serial Nos. 135,913 and 135,914, both filed on September 5, 1961, now Patents 3,180,941 and 3,180,942, respectively, issued April 27, 1965, a multicustomer private branch exchange system is disclosed by means of which private branch exchange service may be furnished to a number of different telephone customers through the use of common switching equipment. The multicustomer private branch exchange automatically establishes communications switching connections for calls incoming from the telephone central (tandem) office to the extension stations of the different PBX customers and, via common link switching equipment, selects the proper customer's attendant for listed directory number, dial "O" operator (PBX attendant) and transfer calls.

The real significance of the technique disclosed in the foregoing system is that none of the PBX customers' switchboard operators are any longer required to be furnished the direct appearance of every, or even any, of the lines and trunks under their control. The supervisory and control functions of the PBX switchboard operator have been relegated to those of "attendant" rather than of "operator." Each of the attendants in the multicustomer PBX answers calls to the listed directory number only of her respective employer and completes them to the appropriate extension stations within her employer's business organization all by use of a cordless console which operates with respect to the lines and trunks on a switched-loop basis. The attendant also may assist an extension user in her customer group to transfer a call, that was originally incoming to that extension user, to another station within the customer group.

While the switching system described in the aforementioned applications permits the attendant to gain control of the inward switching train over which the call was connected from the central office to the call transfer requesting station, so as to connect the incoming trunk to the new extension, it was not envisioned that any one telephone customer would have need for more extension stations than could be reached by the assigned switching train. Accordingly, the fact that a group of extension stations were assigned to a given switching train enabled the common link equipment to maintain customer group integrity by preventing inadvertent transfer of calls, or attendant answering of calls outside her customer group. While one or more additional inward switching trains might be added to serve the extension stations of a large PBX customer, these stations would, perforce, become autonomous groups much as if they were assigned to a different PBX customer rather than to the same customer. It is an object of the present invention, therefore, to provide for the addition of such switching trains and yet maintain the integrity of the PBX customer's communication system.

Another object of the present invention is to permit calls to be transferred between switching trains belonging to the same PBX customer without "busying" any additional trunks incoming from the central office.

Accordingly, it is a general object of the present invention to provide improved call transfer service in large direct dialing private branch exchanges.

The manner in which the present invention achieves the foregoing and other objects may be better understood by reviewing briefly certain features of the prior system mentioned above. It will be recalled that a switching train comprises a plurality of multiple paths for effecting connections between the incoming trunks assigned to a PBX customer and the extension stations of that PBX customer, the number of such multiple paths depending upon the number of simultaneous conversations to be permitted. Each incoming trunk is directly associated with an incoming first selector of the switching train. On inward-bound calls, the group of trunks assigned to a PBX telephone customer's switching train are ascertained at the central office by the TH digit of the called extension station's telephone number. The central office selects an idle trunk in the group and transmits the H, TN, and U digits thereover to operate the incoming first selector and the subsequent stage or stages of that customer's inward switching train.

When the first-called extension station in the previous system desired to transfer an incoming call to another extension station, the extension user flashed the switchhook of his telephone. The incoming trunk responded to the switchhook flash and signaled the common link switching equipment to put the first extension station in touch with an appropriate attendant. The common link switching equipment functioned to connect the incoming trunks belonging to different PBX customers to their respective attendant loop circuits. Incoming trunks belonging to different PBX customers, and therefore to different switching trains, were connected to correspondingly different attendant loops. As a corollary, each switching train required its own group of attendant loops. In the present invention, however, a group of attendant loops is permitted to serve a plurality of switching trains but only if these trains are assigned for use by the same PBX telephone customer.

It was an important feature of the prior system that calls could be transferred between extension stations of the same PBX customer by permitting the attendant to gain control of the inward switching train and to re-operate that train for the purpose of establishing the transfer connection to the new extension station. The system of the present invention also permits this re-control, through a switched-in attendant loop, of the inward switching train that was used to connect the incoming trunk with the first (transferring) extension. In addition, however, the attendant loop may be given control of whichever one of the other switching trains (accessible to the common link equipment of the multicustomer PBX system) serves the new extension station of the same PBX customer.

In accordance with the principles of the present invention an intergroup transfer trunk is provided between each trunk incoming from the (tandem) central office and its associated incoming first selector. All the intergroup transfer trunks for the same switching train are grouped on distinctive levels of an intergroup trunk finder. The intergroup transfer trunks are prepared for operation when the attendant answers a call that is switched-in to one of the loops at her console. This call may be either a request to transfer a call (incoming from the central office) to a different extension than that to which it was initially routed, or it may be a call initially incoming to the customer group attendant. In either event, when so activated, the intergroup transfer trunk indicates the identity of its associated incoming trunk group (hence switching train) to the intergroup trunk finders. The intergroup trunk finders are each associated with a respective intergroup selector on whose banks appear circuits for obtaining access to the bank multiples of each of the switching trains serving the different extension stations of the attendant's customer group. After the attendant obtains the number of the desired extension from the calling party (or from the transferring extension who thereafter disconnects or is disconnected by the attendant) the attendant keys the new number. The new number is transmitted through the attendant loop circuit, over the intergroup transfer trunk and the operated trunk finder to step the intergroup selector to the level determined by the TH digit of the new number. Circuits connecting the intergroup trunk finder with the intergroup selector compare the level upon which the transfer requesting trunk appears (on the trunk finder banks) with the level to which the intergroup selector is stepped by the TH digit. If these levels agree it means that the new extension is served by the same trunk group and hence the same switching train as the old (transferring) station. A signal indicating this agreement of levels allows the intergroup transfer trunk to release the intergroup trunk finder and the intergroup selector and to apply the H, TN, and U digits keyed by the attendant to the same incoming first selector as was used initially to establish a communications path to the old extension. The incoming first selector operates in response to the H digit and the remainder of the switching train operates in response to the TN and U digits to complete the transfer to the new extension.

On the other hand, if the level detected by the trunk finder disagrees with the level to which the intergroup selector is stepped by the TH digit it indicates that the new extension is served by a different group of trunks (and a different switching train) than that over which the call was incoming from the central office. The signal indicating the disagreement between the levels allows the intergroup transfer trunk to maintain its signaling path through the trunk finder and intergroup selector. The idle outlet selected by the intergroup selector in response to the TH digit is associated with an intergroup second selector whose bank terminals multiple to the bank wiring of the switching train serving the new extension. The H digit keyed by the attendant steps the intergroup second selector to select one of the outlets on its bank in the same manner as the incoming first selector of the associated switching train would have selected an outlet had the H digit been transmitted by a trunk incoming from a (tandem) central office. However, inasmuch as the outlet is selected without operating any of the associated incoming selectors of this switching train, no trunks incoming from a (tandem) central office are made busy and any of the incoming first selectors may still be seized by the (tandem) central office to handle an incoming call even while a call is being transferred. The subsequently transmitted TN and U digits then operate the remainder of the inward switching train serving the new extension, and the transfer is completed.

According to one aspect of the foregoing embodiment, when calls are incoming to the listed directory number of the PBX customer, the incoming first selector of the inward switching train is stepped to the level of attendant trunks. When this level is reached, the incoming trunk is signaled and in turn is connected by the common link switching equipment to an idle loop at an attendant position belonging to that PBX customer. Incident to the seizure of the idle loop the incoming first selector is released and the presence of a directory number call is indicated to the attendant at the attendant position. The attendant answers the call by depressing the LOOP key and then converses with the calling party who furnishes information enabling the attendant to determine the number of the desired extension. This extension may be served either by the switching train associated with the incoming first selector which has just been released, in which case the number keyed by the attendant re-operates the incoming first selector and the remainder of the associated switching train, or the new extension may be served by another of the switching trains furnished the PBX customer, in which case the re-operation of the incoming first selector would be of no avail. Under the last-mentioned circumstances the fact that the desired extension is served by a different switching train is ascertained incident to the attendant's keying the TH digit of the desired station's number and the intergroup selector operated thereby obtains access to an intergroup second selector whose outlets, selected by the H digit, multiple to the desired switching train. The subsequently transmitted TN and U digits then operate the remainder of the switching train as for a transfer call.

Accordingly, a feature of the present invention is an arrangement for transferring calls between extensions served by different switching trains.

Another feature of the present invention is such a call transfer arrangement which is common to the different switching trains and which also permits calls to be transferred between extensions served by the same switching train.

According to one aspect of the foregoing feature, the switching train connection to the transferring station is released and that switching train is re-operated to establish the connection to the desired extension served by that switching train.

A further feature of the present invention is an arrangement for identifying the trunk group and therefore the switching train being activated by a transfer requesting station served by the switching train and for determining whether a desired station may be served by the identified switching train.

Still another feature of the present invention is an intergroup switching arrangement which permits the operation of a portion of a switching train other than the one in which a call-transferring condition is detected without making any of the trunks incoming from the central office to that other switching train busy.

The foregoing and other features may be more clearly understood when the following detailed description is read in conjunction with the drawing in which:

FIGS. 1 through 4, arranged as shown in FIG. 5, show a block diagram representation of the switching system of the present invention;

TABLE OF CONTENTS

Figure 7:
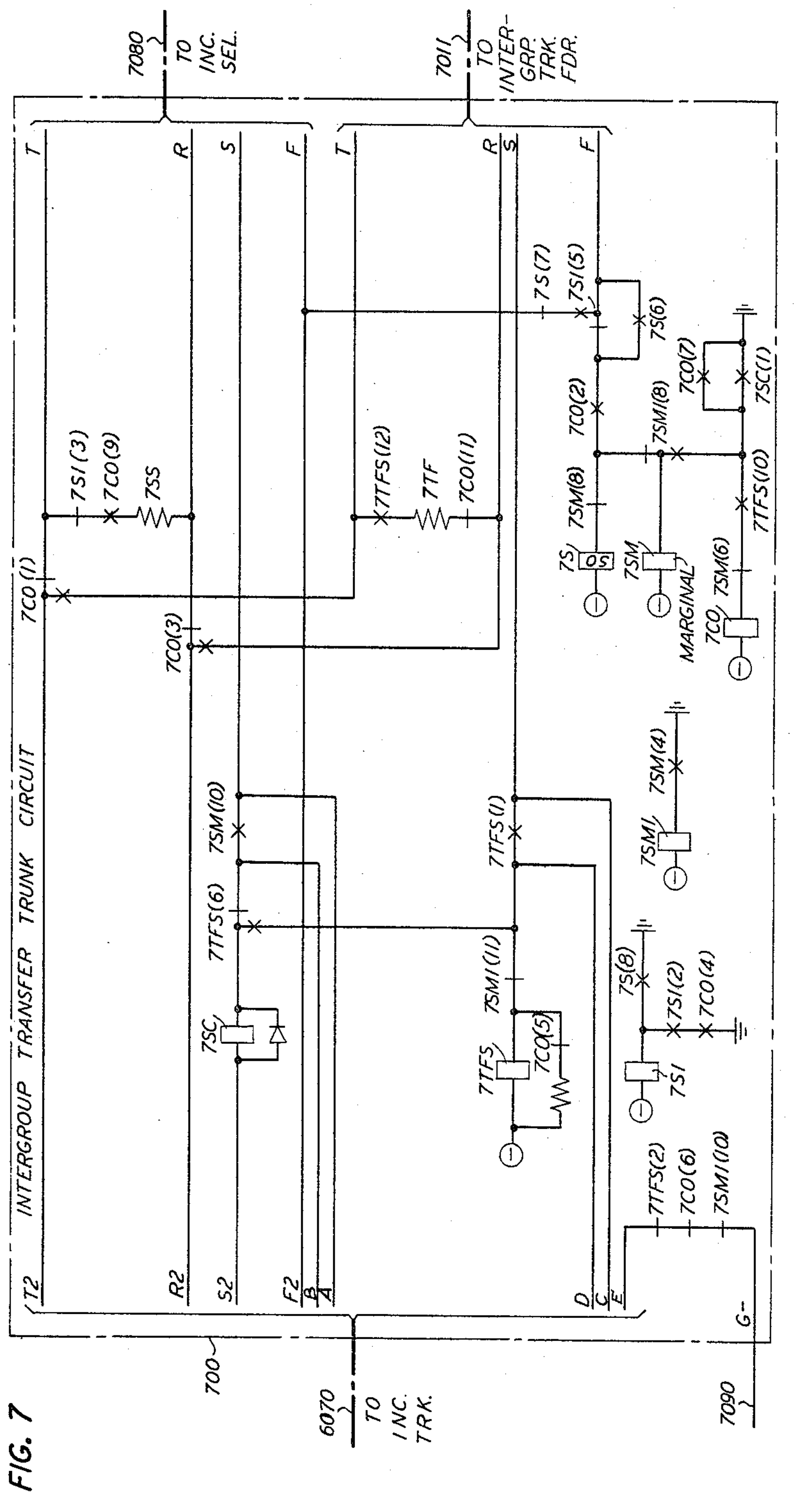
FIG. 7 shows the details of the intergroup transfer trunk.
Figure 8:
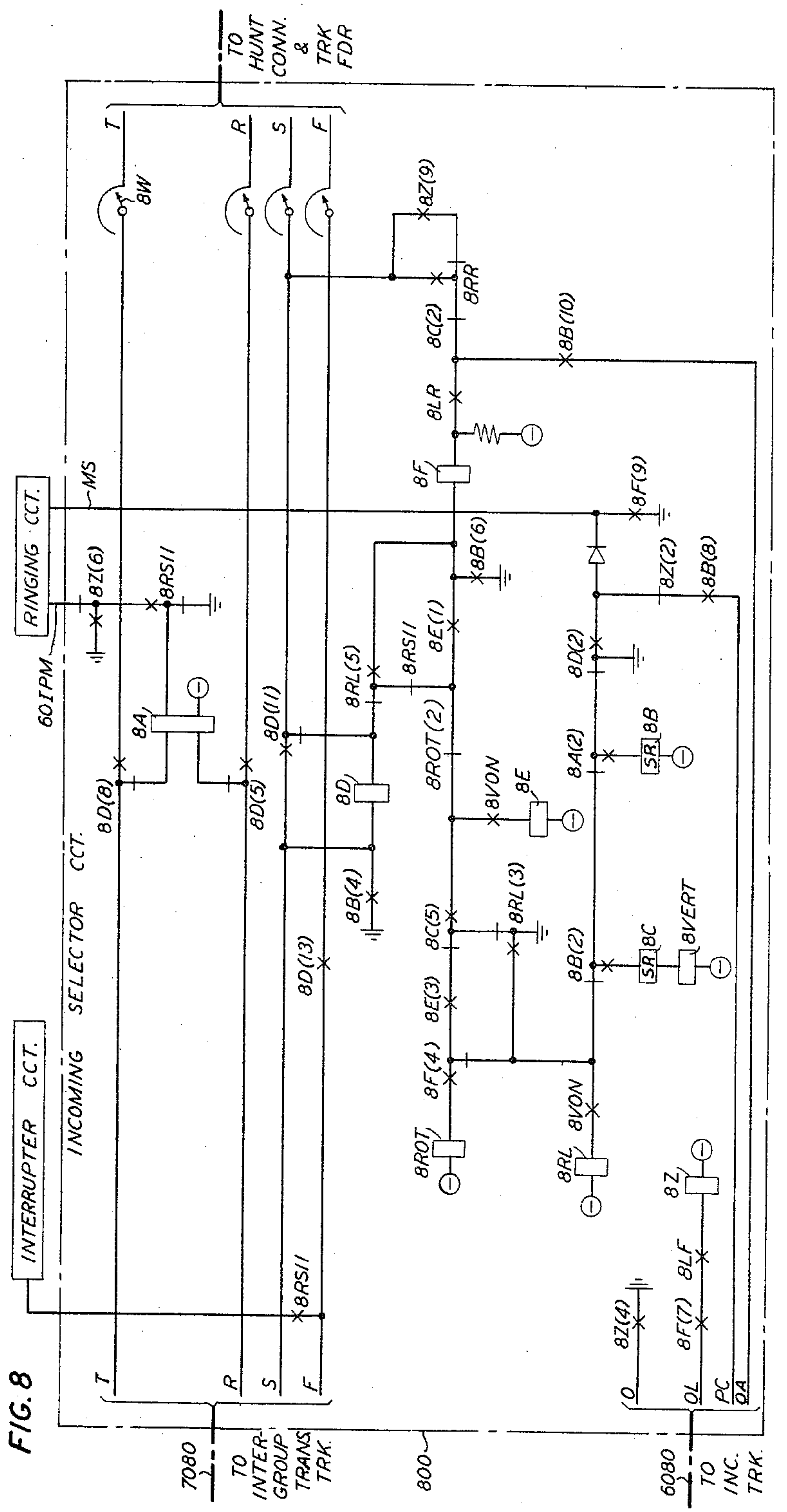
FIG. 8 shows the details of the incoming first selector.
Figure 10:
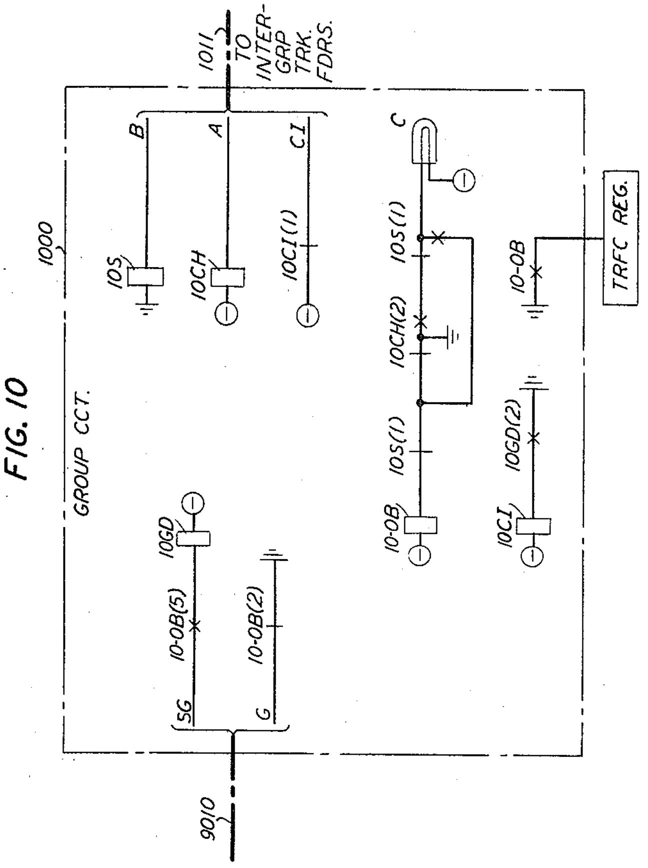
FIGS. 9 and 10 show respectively the subgroup and group circuits associated with the intergroup transfer trunks.
Figure 9:
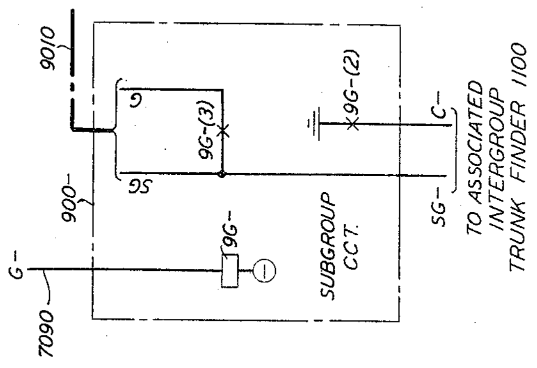
Figure 11:
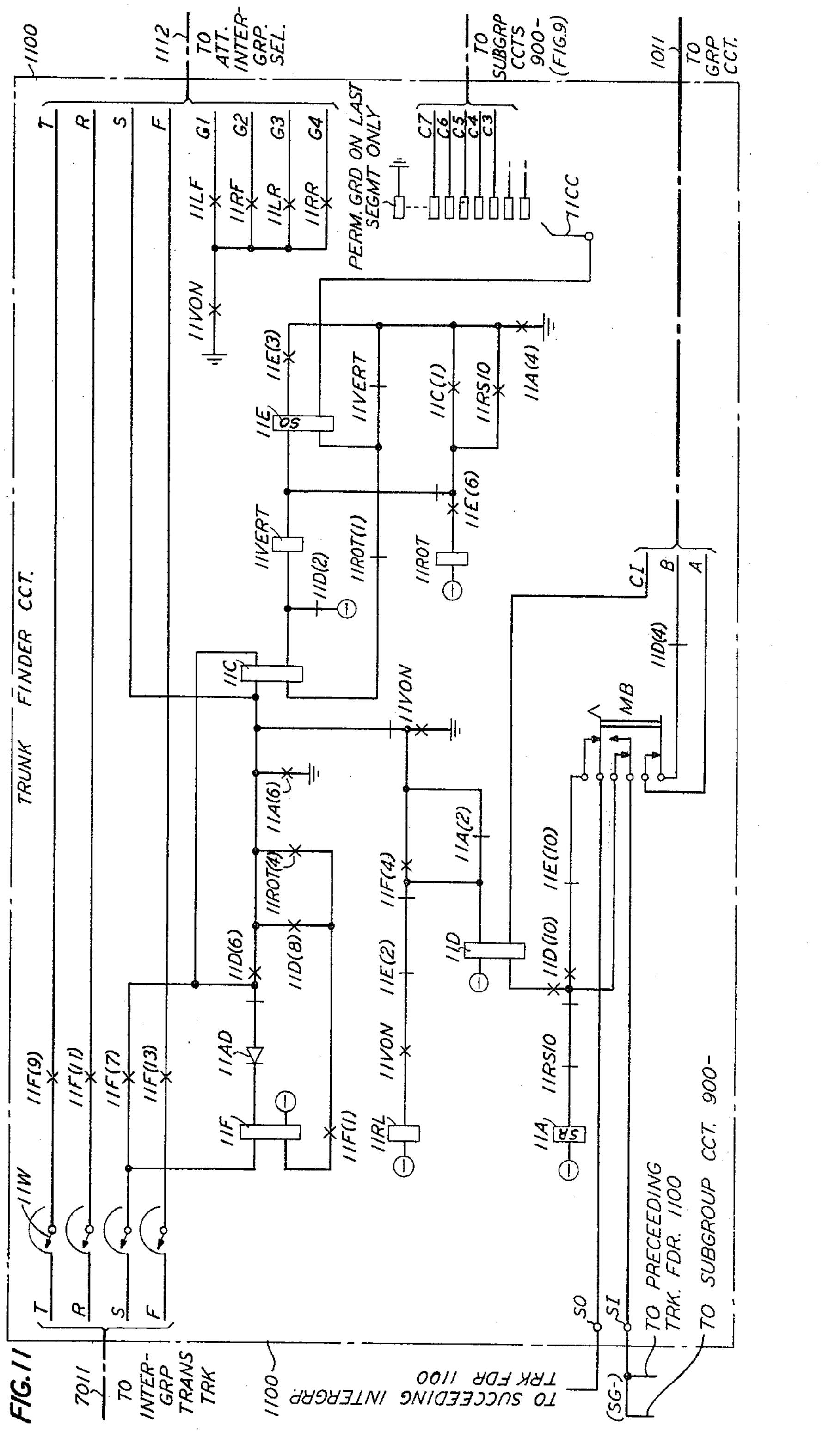
FIG. 11 shows the details of the intergroup trunk finder.
Figure 12:
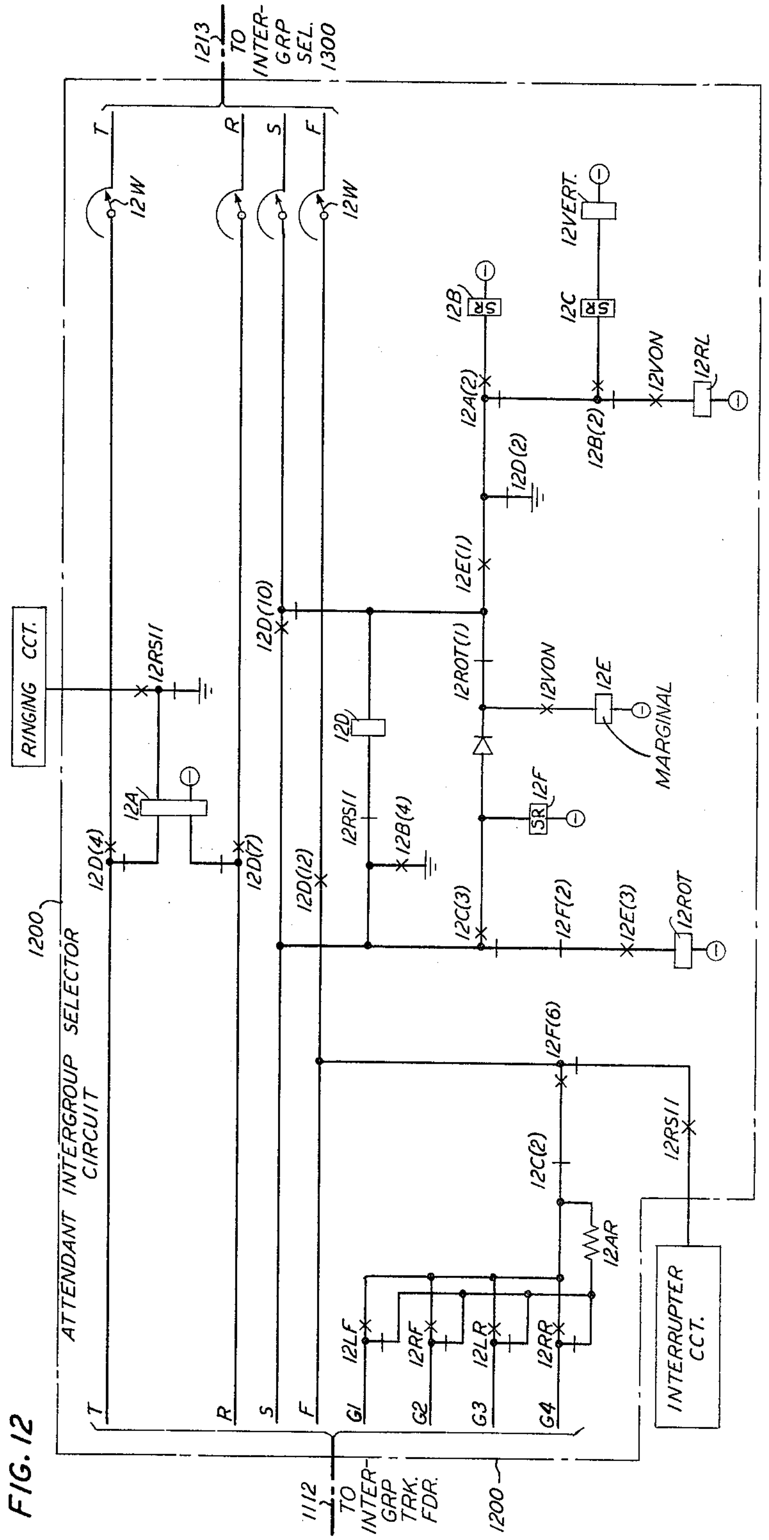
FIG. 12 shows the details of the intergroup selector.

| | Column |
|---|---|
| I. General Description of Block Diagram (FIGS. 1–4) | 4 |
| II. Detailed Description | 9 |
| A. Intergroup Transfer Trunk **700** (FIG. 7) | 9 |
| B. Attendant Intergroup Selector **1200** (FIG. 12) | 11 |
| C. Incoming Trunk Circuit **600** (FIG. 6) | 13 |
| D. Subgroup **900**– and Group **1000** Circuits (FIGS. 9–10) | 15 |
| E. Trunk Finder **1100** (FIG. 11) | 16 |
| F. Incoming Selector Circuit **800** (FIG. 8) | 19 |

I. *General description of block diagram (FIGS. 1–4)*

Figure 6:
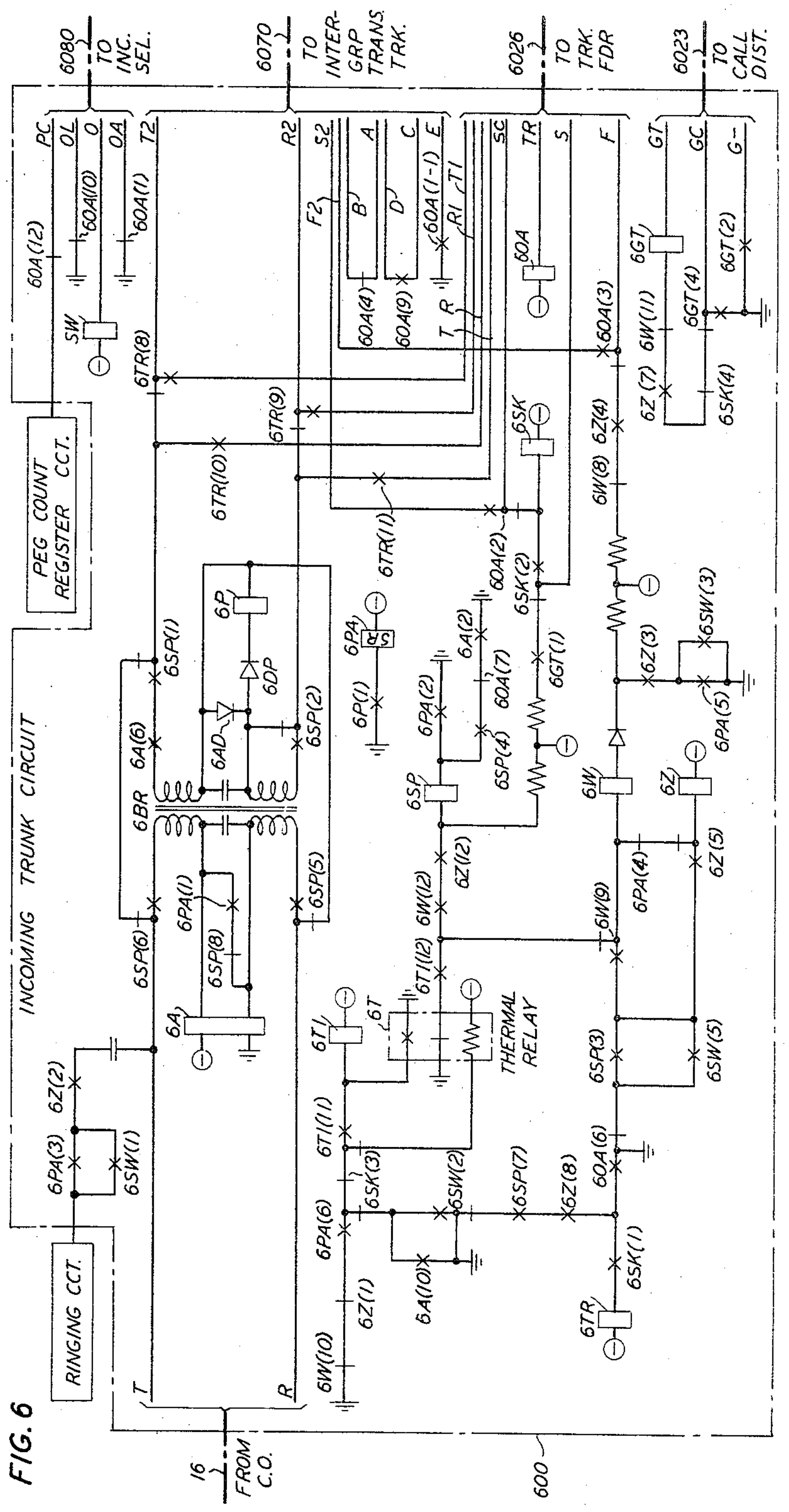
FIG. 6 shows the details of the incoming trunk circuit.

The multicustomer private branch exchange system apparatus is located close to the concentration of the PBX service telephone customers' extension stations which are to be served. This location, for example, may be the basement of a large office building which houses the several business tenants and may be some distance removed from the central office which is shown at the left-hand side of FIGS. 1 and 2. The switching system is connected to the central office by a plurality of incoming trunks 600 (the details of which are shown in FIG. 6).

Incoming trunks 600 are arranged in ten trunk subgroups, and one or more of such subgroups is associated with the inward switching train of each PBX customer. As many subgroups of the trunks 600 are provided as are required to handle the combined incoming traffic anticipated for the listed directory number and for the extension stations of each customer. For example, the listed directory number 6000 and the extension stations 6100 through 6999 served by the switching train 801 of FIG. 1 anticipate sufficient incoming traffic to require a group of twenty incoming trunks 600 and so two subgroups, of ten trunks each, are shown. The same telephone customer to whom these extension stations belong also has another group of up to a thousand extension stations having the telephone numbers 3000 through 3999. These stations are served by inward switching train 803 and their volume of incoming traffic is such that the ten incoming trunks 600, shown in the left-hand part of FIG. 2, suffice. Other telephone customers served by the multicustomer private branch exchange are assigned similar inward switching trains and associated groups of incoming trunks, as is indicated in FIG. 4.

As described in the above-mentioned copending applications of O. H. Williford and V. J. Matthews, each of the incoming trunks in each of the subgroups of trunks belonging to a switching train also has an appearance on the banks of the plurality of trunks finders 26, shown in FIG. 4. The call distribution circuit 23, position finders 27, attendant loop circuits 25, 25', position circuits 24, 24' and register sender link 81 are also shown in the above-mentioned applications and bear the same reference numerals therein. The attendant consoles 5–8 (5–8)' are referred to as the common keys and lamps in FIGS. 5 and 8 of these applications. Details of the register sender 82 and register sender link 81 may be found in the copending application of P. H. Arnold et al., Serial No. 109,444, filed May 11, 1961, now Patent 3,151,220, issued September 29, 1964.

Figure 4:
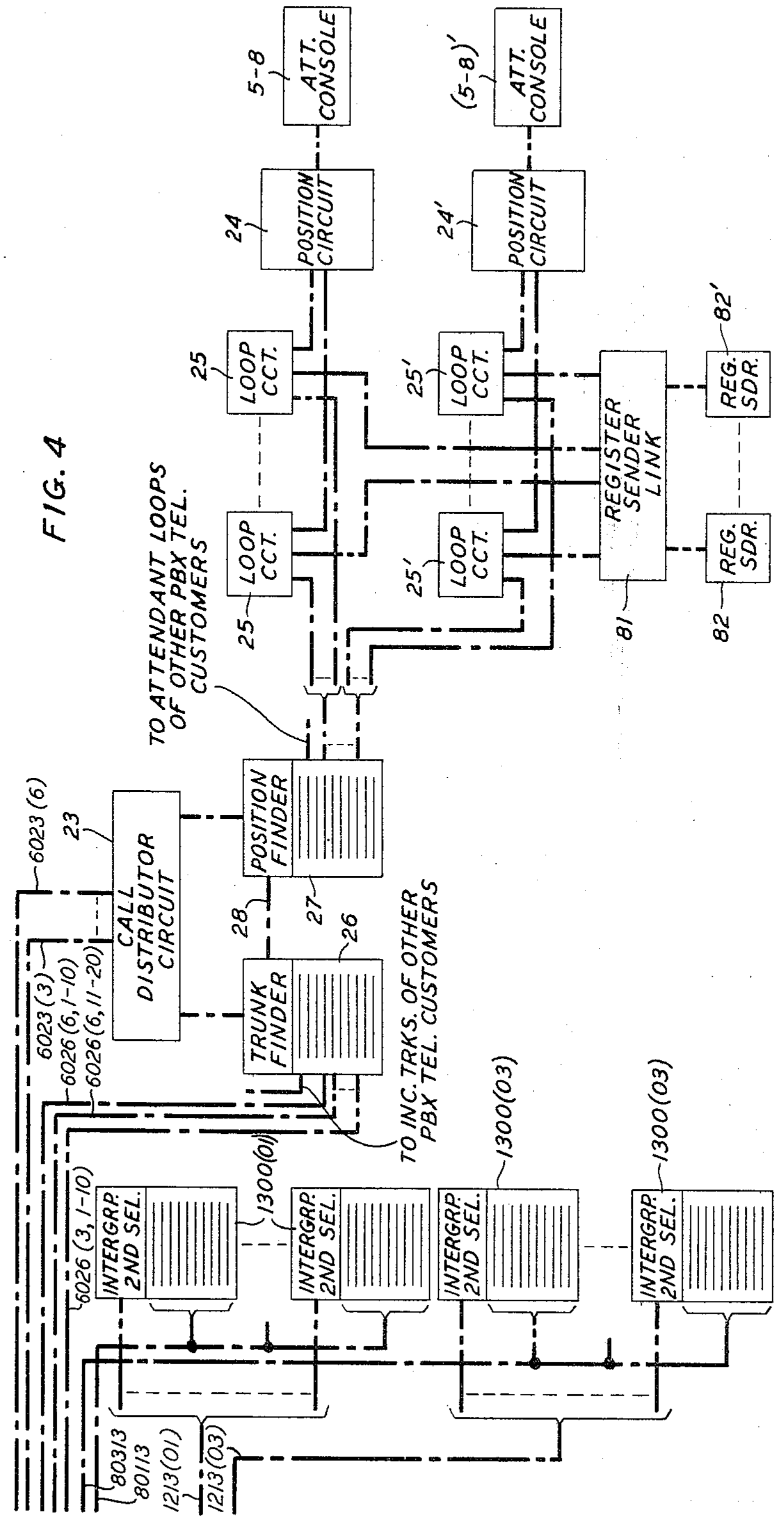

With the exception of the intergroup second selectors 1300, the operation of all of the apparatus of FIG. 4 is disclosed and described in detail in these copending applications. Briefly, however, the apparatus is called into operation by one of the incoming trunks 600 of FIG. 1 or 2 activating appropriate leads in its respective requesting cable 6023 entering call distribution circuit 23. The call distribution circuit selects an idle trunk finder-position finder pair 26–27. The requesting incoming trunk marks its appearance on the bank of the trunk finders 26 and the call distribution circuit 23 marks the level on the bank of position finders 27 of attendant positions appropriate to the customer group of trunks in which the requesting trunk is located. Call distribution circuit 23 then allows the selected trunk finder 26 and position finder 27 to respectively hunt for the requesting trunk and to hunt for an idle attendant loop circuit 25 appearing at the marked level. When the trunk finder 26 and position finder 27 have respectively found the requesting trunk and an idle loop circuit 25, an auxiliary communications path is selected from the requesting incoming trunk 600, over its respective communications path cable 6026, the bank and wipers of trunk finder 26, cut-through connection 28, the wipers and bank of position finder 27, the selected loop circuit 25, and position circuit 24 to attendant console 5–8. The attendant at attendant console 5–8 answers the call and, by operating various control buttons at her console, may cause her loop circuit to obtain access to a register sender 82 through a register sender link 81. The attendant may then key a new extension number into the selected register 82, and cause the selected register to outpulse the new extension number back over the aforementioned auxiliary communications path to re-operate the incoming first selector 800 associated with the one of incoming trunks 600 which initially exhibited the requesting condition. Inasmuch as the re-operation of the incoming first selector associated with the requesting one of the incoming trunks could only control its associated switching train to effect a connection to one of the thousand extension stations served by that switching train, it would be impossible for the attendant to transfer a call to an extension station served by a different switching train. While this fact constituted no drawback when the multicustomer private branch exchange system was called upon to serve different PBX customers having fewer than a thousand extension stations each, and may even have constituted an advantage insofar as a customer's attendant could not inadvertently transfer a call to an extension outside her business organization, it is apparent that call transfer would be materially hampered by these restrictions were the system to attempt to serve PBX customers having more than a thousand extensions each.

Let it be assumed that a large PBX telephone customer served by the multicustomer private branch exchange is assigned two inward switching trains 801, 803 whose incoming trunks 600 appear via their cables 6023 and 6026 in call distribution circuit 23 and trunk finders 26, respectively (FIG. 4). The other groups of incoming trunks belonging to other PBX customers also have their usual appearances in trunk finder 26 and in call distribution circuit 23, and are assigned their respective attendant equipment, etc., but for the sake of clarity, the circuits and equipments for these other customers are omitted from the drawing.

Figure 1:
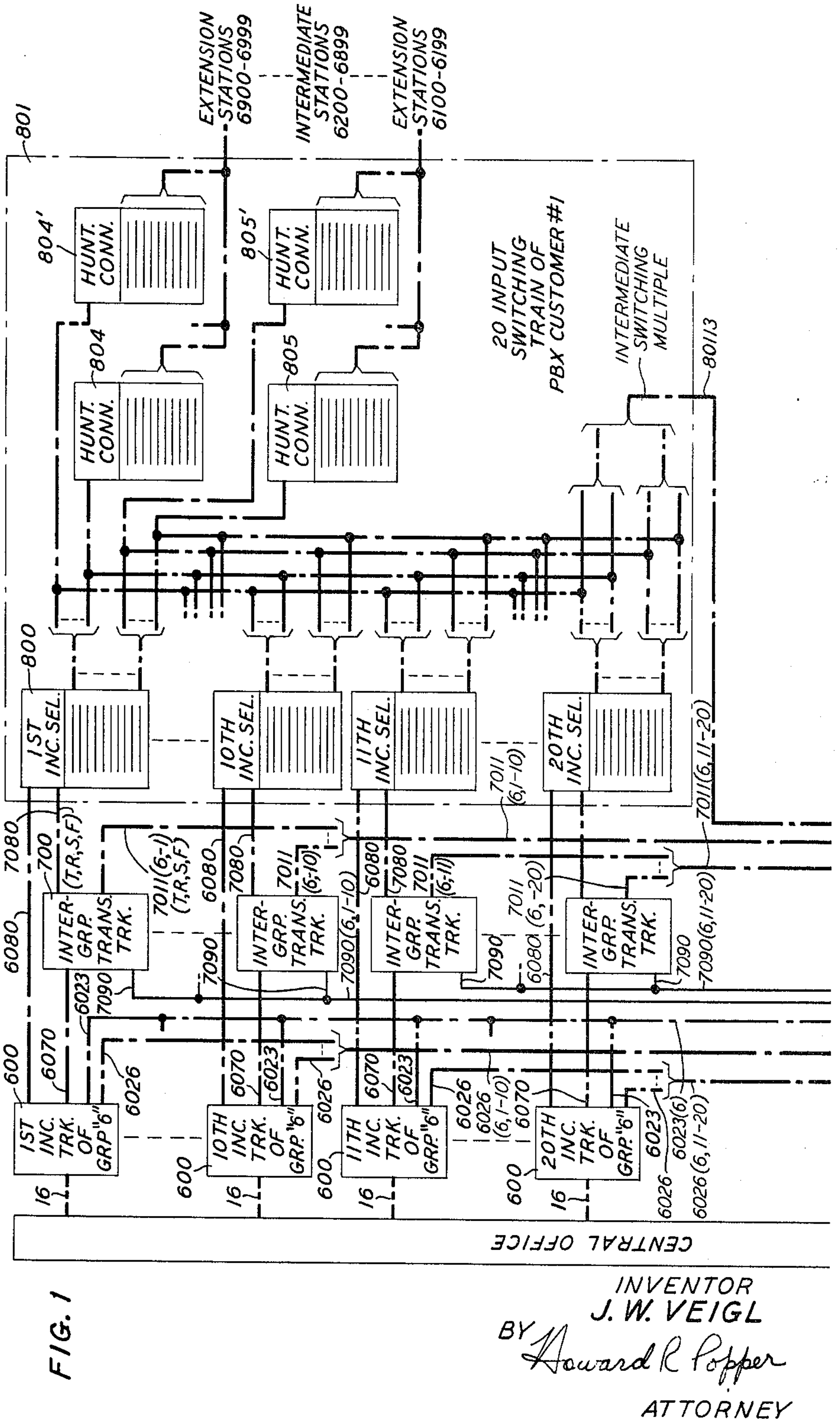

Let it be further assumed that a call is initially incoming to an extension station in the group served by switching train 801, say, extension station 6999. The tandem central office utilizes the TH digit of the extension station's telephone number to select the appropriate trunk group and then seizes an idle one of trunks 600 (say, the topmost one) in the selected group. Each trunk 600 in the group of twenty trunks (two, ten-trunk subgroups) of FIG. 1 is associated with a respective incoming first selector 800 of switching train 801 and is connected to its respective incoming first selector 800 by a cable 6080. At this time cable 6070 also may be considered to directly connect the incoming trunk to its associated selector through the associated intergroup transfer trunk 700 and cable 7080. The H, TN, and U digits outpulsed by the tandem central office to the uppermost incoming trunk 600 are applied over cable 7080 and operate, respectively, the uppermost incoming first selector 800 and one of the connectors 804, 804'. The uppermost incoming selector 800 is driven to its ninth level of terminals by the H digit and hunts across the terminals on this level for an idle one of hunting connectors 804 through 804', there being as many connectors 804 through 804' on this level as are required to handle the traffic volume anticipated for the extension stations having numbers 6900 through 6999. An idle one of the connectors having been selected, the TN digit steps the connector to the ninth level of terminals on its bank and the U digit causes the connector to connect to the ninth terminal on this level. Ringing is applied by the connector in the usual manner and the called party answers.

The called party at extension station 6999 may determine that the call should be transferred to extension 6100 and the extension user at 6100 may, in turn, determine that the call should be transferred to station 3199. The intergroup transfer trunk 700 permits the attendant called in by the transfer request from station 6999 to re-control the incoming first selector 800 to select one of hunting connectors 805, 805' for transferring the call to extension station 6100. The same intergroup transfer trunk 700 also enables the attendant to obtain access to the switching train multiple 80313 via an intergroup first and second selector 1200, 1300 to cause switching train 803 to connect to station 3199 without making busy any of the ten incoming trunks 600 of FIG. 2 that are associated with inward switching train 803.

When extension station 6999 determines that the call should be transferred, he flashes his switchhook to alert the incoming trunk 600 over which the call was received. The incoming trunk 600 activates its leads of cable 6023 to call distribution circuit 23 and thereupon ensue the operations which have briefly been summarized above and which are described in detail in the aforementioned Williford and Matthews applications. The extension user at extension 6999 is connected to one of the attendants serving his business organization. The attendant depresses the LOOP key (not shown) at her console 5–8 (FIG. 4) to answer the call and is informed that the call is to be transferred to extension 6100. The transferring station then disconnects. The attendant thereupon depresses the START key (not shown) at her console 5–8 and keys the number 6100.

Figures 3, 5:
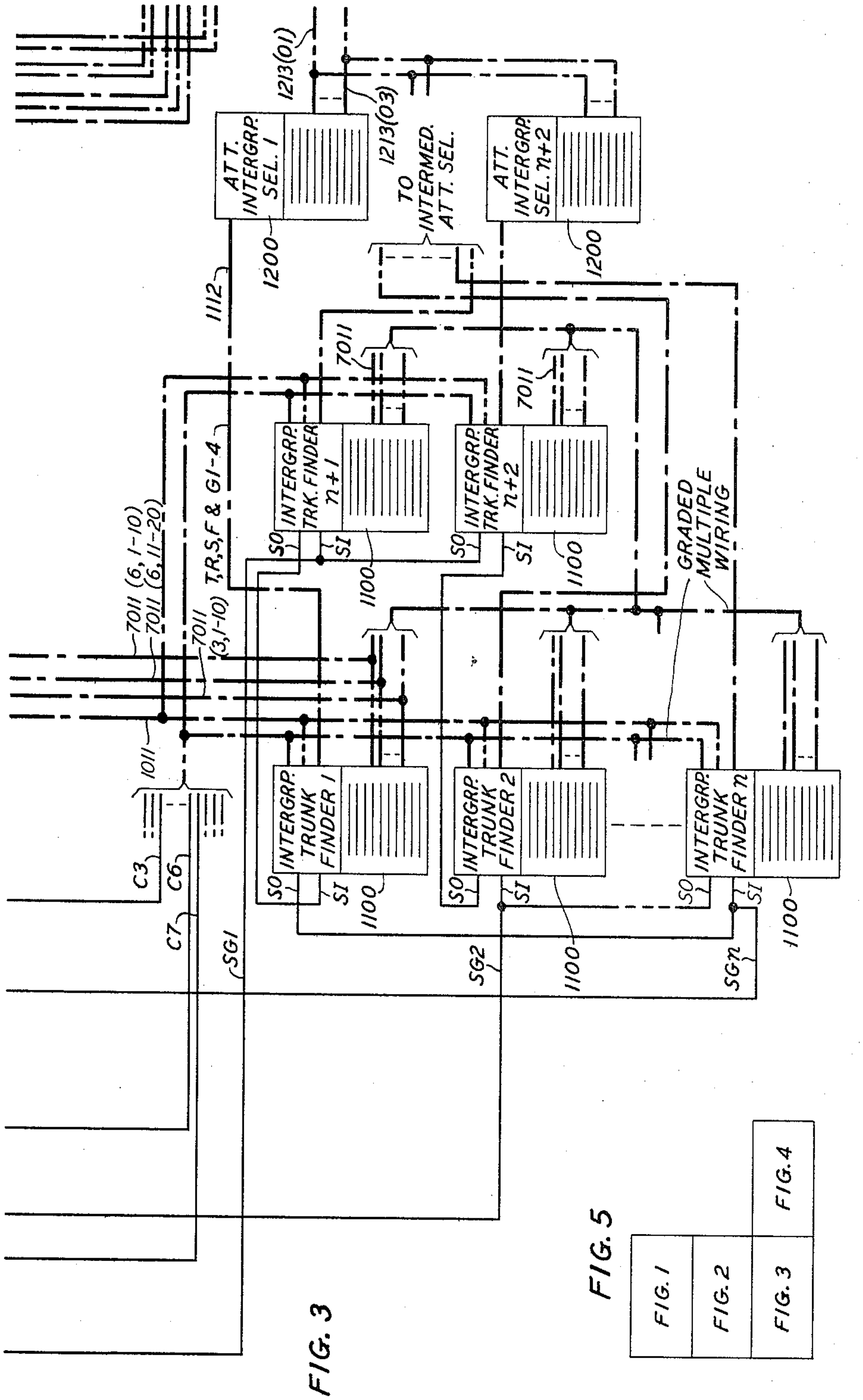

In addition to these operations which take place, the intergroup transfer trunk 700 is brought into operation by its associated incoming trunk 600 at the time the attendant depresses the console LOOP key for the loop selected by position finder 27 in assigning an attendant to execute the transfer request. The intergroup transfer trunk 700, activated by its associated incoming trunk 600, responsive to the operation of the LOOP key, energizes its requesting leads 7090 to its associated one of subgroup circuits 900–. More particularly, any of the ten intergroup transfer trunks 700 constituting the first subgroup of trunks associated with inward switching train 801 so activated by its associating incoming trunk 600 would energize its requesting lead G7 to subgroup circuit 900A. Any of the ten intergroup transfer trunks 700 constituting the second subgroup of trunks associated with inward switching train 801 would energize its requesting lead G6 to subgroup circuit 900B. The activated subgroup circuits 900– mark their respective one of commutator "C–" leads C3, C6, or C7 and energize a corresponding one of start ground "SG–" leads SG*n* through SG2 or SG1, respectively. Each of the start ground leads SG1 through SG*n* is connected to the start-in terminal SI of a respective one of trunk finders 1100 and starts that trunk finder if it is idle. If this "preferred" trunk finder is busy, the start-in ground is applied by that trunk finder to its start-out terminal SO which is connected to the start-in terminal SI of the next-preferred one of trunk finders 1100. In FIG. 3 two more, i.e., $(n+2)$, trunk finders 1100 are shown than the number $(n)$ of start leads (and associated subgroup circuits 900–) because it is desired to be able to maintain simultaneously more than one transfer call in the same subgroup of trunks.

Each trunk finder 1100 is associated with a respective attendant intergroup selector 1200. In the illustrative example, at the time that the attendant depresses her LOOP key to answer the transfer request originated by extension station 6999, the $(n+1)^{th}$ trunk finder 1100, which is the preferred trunk finder for subgroup circuit 900A, may be assumed to have been busy and therefore its start-out terminal SO applies the starting ground to the start-in terminal SI of the 1st trunk finder 1100. The C7 lead energized by subgroup circuit 900A is connected in graded multiple fashion to each of the 1st through $(n+2)^{nd}$ trunk finders 1100 so that whichever trunk finder 1100 is started into operation by the grounding of its SI terminal will rise to the correspondingly energized level of the graded appearances of lead C7. Each intergroup transfer trunk 700 in the subgroup of ten trunks associated with subgroup circuit 900A is also connected in graded multiple fashion and appears on the levels of the $(n+2)$ trunk finders indicated by lead C7. When the intergroup trunk finder has found the intergroup transfer trunk, and while the attendant is in conversation with the calling and transferring parties, the intergroup transfer trunk conditions the sleeve lead of the incoming trunk, that prior to the attendant answering was connected to the incoming first selector, to respond to the connection of a register sender to the attendant loop circuit. At the conclusion of this conversation the transferring station disconnects (or may be disconnected by the attendant) and the incoming first selector 800 is thereby released.

When the attendant depresses her START key, the incoming first selector 800 (which was released when station 6999 disconnected) is available to respond to the pulsing provided by the register sender 82 which has been associated with loop circuit 25. Before this is permitted, however, intergroup transfer trunk 700 responds to the initial connection of the register sender to transfer the pulsing path to the intergroup selector 1200 through the operated intergroup trunk finder 1100. The TH digit, which is the first digit of the new extension's telephone number outpulsed by register sender 82, is applied to the intergroup selector 1200 which is stepped to the corresponding level. Normal-post springs of the attendant intergroup selector are operated at this level and directly connect one of the G leads of cable 1112 to the F lead thereof. Of these G leads in cable 1112, one was grounded by the associated trunk finder 1100. If the operated normal-post spring of the attendant intergroup selector directly connects the grounded G lead to the F lead of cable 1112 by a low resistance path, relays in the intergroup transfer trunk are operated. On the other hand, if the normal-post springs of attendant intergroup selector 1200 connect the G leads to the F lead with a high resistance, relays of the intergroup transfer trunk circuit 700 are operated. These relays release the incoming first selector which had been reseized and held at the time the pulsing path was transferred to the intergroup selector. The transferred pulsing path continues to be held so that the intergroup second selector 1300 may be operated on the H digit to seize an appropriate switching train multiple input 80313. Thereafter the connector of the switching train 803 is operated by the TN and U digits to complete the communications path from the incoming trunk 600 of FIG. 1 to the desired extension station 3199 of FIG. 2.

If, instead of a direct in-dialing call, a listed directory number call had initially been made over the incoming trunk 600 of FIG. 1, the incoming first selector of switching train 801 would have been operated to the tenth level (the level of attendant trunks) and would have caused the call distribution circuit of FIG. 4 to connect the incoming trunk to an attendant loop circuit 25. The incoming selector would be released by the attendant answering the call because the attendant loop circuit provides a unidirectional holding bridge between the tip and ring conductors which is poled to provide a high impedance when battery and ground are obtained from an incoming first selector. (Conversely, a low impedance path is provided for battery and ground polarities obtained from one of the connectors 804, etc., as on the transfer of in-dialed calls.) The attendant converses with the calling party, depresses the START key at her console to associate a register sender 82 and keys the number of the desired extension. The intergroup transfer trunk 700 detects the presence of the register sender, reseizes the incoming first selector, and transfers the pulsing path to the intergroup selector 1200 which was connected through an intergroup trunk finder 1100 when the attendant answered the call in the same manner as just described for the transfer call. Thereafter the high or low resistance ground returned to the intergroup transfer trunk enables it to maintain or release the transferred pulsing path and reseized first selectors to complete the communications connection.

*Detailed description*

A. INTERGROUP TRANSFER TRUNK 700 (FIG. 7)

A station flashing for transfer activates the incoming trunk 600 causing the trunk to be connected to an idle attendant loop 25 and illuminating an associated lamp at console 5–8. The attendant in answering the call depresses the LOOP key opposite the illuminated lamp, thereby grounding lead TR of cable 6024 and operating relay 60A in the incoming trunk 600 (FIG. 6). Relay 60A operated, at its back contact 60A(1), removes ground from the OA lead of cable 6080 to the incoming first selector 800. Relay 60A operated, at its make contact 60A(9), connects together the C and D leads of cable 6070 to the intergroup transfer trunk, which leads when connected together bridge contact 7TFS(1), thereby connecting resistance battery to the S lead of cable 7011 toward the intergroup trunk finder 1100. Relay 60A operated, at its contact 60A(1), applies ground to the E lead of cable 6070 which is extended over back contacts 7TFS(2), 7C0(6), and 7SM1(10) to the G– lead 7090. The leads 7090 for ten intergroup transfer trunks 700 are connected to the same subgroup circuit 900–. The subgroup circuit operated starts a trunk finder 1100 hunting for the resistance battery appearing on the S lead of cable 7011. When the trunk finder 1100 finds the resistance battery, it applies ground to the S lead of cable 7011 which ground operates relay 7TFS. Relay 7TFS locks to ground over make contact 7TFS(1) and at its back contact 7TFS(2) removes ground from the G– lead 7090 to release the associated subgroup circuit 900–. Relay 7TFS operated, at its make contact 7TFS(12), connects resistor 7TF across leads T and R of cable 7011 to the intergroup trunk finder. This resistance bridge 7TF holds relay 12A operated in the attendant intergroup selector circuit 1200. Relay 7TFS operated, at its make contact 7TFS(10), prepares a path for operating relay 7C0 and, at its make contact 7TFS(6), extends the ground appearing on the S lead of cable 7011 through the winding of relay 7SC to the S2 lead of cable 6070 toward the incoming trunk circuit 600.

The attendant receives the required information, the transferring station disconnects, and a portion of the attendant loop 25 releases removing the holding bridge from leads T2 and R2 of cable 6070. The incoming selector 800 and the one of connectors 804, 804', 805, 805', that was used initially to extend the in-dialing connection to the transferring station, releases. The attendant depresses the START key at her console 5–8 causing a register sender 82 to be attached to her loop circuit 25. The battery applied over lead S2 of cable 6070 by the attaching of the register sender operates relay 7SC. Relay 7SC operated, at its make contact 7SC1, completes an operating ground to relay 7C0 which operates.

Relay 7C0 operates, locks to ground over its make contact 7C0(7), and at its transfer contacts 7C0(1) and 7C0(3) transfers leads T2 and R2 of cable 6070 to leads T and R of cable 7011 toward the intergroup transfer trunk finder and intergroup selector. Relay 7C0 operated, at its back contact 7C0(6), maintains the G– lead 7090 isolated from the E lead of cable 6070. Relay 7C0 operated, at its make contact 7C0(2), connects the F lead of cable 7011 to the windings of relay 7S and 7SM. Relay 7C0 operated, at its make contact 7C0(9), inserts resistor 7SS across the T and R leads of cable 7080 to reseize the associated incoming first selector 800. Relay 7C0, at its make contact 7C0(4), prepares a holding path for relay 7S1 and, at its back contact 7C0(11), removes the resistance bridge 7TF from the T and R leads of cable 7011 toward the intergroup transfer trunk finder 1100. The trunk finder 1100 and the associated intergroup selector 1200 remain held by the bridge provided by the register sender across leads T2 and R2 of cable 6070.

The attendant, upon being supplied an indication that a register sender has been seized, may thereupon key the digits of the desired extension station. The first or TH digit of the desired extension station's number steps the intergroup selector 1200. If the TH digit is associated with an extension station served by a different group of trunks than the group including the trunk over which the call was initially routed to the transferring extension, the intergroup selector returns resistance ground on lead F of cable 7011 for a period of 100 to 140 milliseconds. Relay 7S operates in response to the resistance ground on lead F of cable 7011 but relay 7SM, being a marginal relay, does not operate at this time. Relay 7S operated, at its back contact 7S(7), maintains the F lead of cable 7011 isolated from the F2 lead of cable 6070 so that the destination lamp STA (shown in FIG. 8 of the above-mentioned applications) associated with the F lead at the attendant console will inadvertently be lighted and falsely indicate that the destination station has answered. Relay 7S operated, at its make contact 7S(6), prepares a holding path to the F lead of cable 7011 and, at its make contact 7S(8), completes an operating path for relay 7S1. Relay 7S1 operates and, at its make contact 7S1(2), locks to the ground provided over make contact 7C0(4). Relay 7S1 operated, at its back contact 7S1(3), removes resistance bridge 7SS from the T and R leads of cable 7080 thereby releasing the incoming selector 800. This incoming selector is released because it does not belong to a switching train capable of extending a connection to the desired extension. Relay 7S1, at its make contact 7S1(5), prepares a path between the F lead of cable 7011 and the F2 lead of cable 6070.

Relay 7S releases when the 100 to 140 milliseconds resistance ground is removed from the F lead of cable 7011. Relay 7S released, at its back contact 7S(7), completes a path between the F lead of cable 7011 and the F2 lead of cable 6070 that was prepared by make contact 7S1(5). The "F" leads so extended constitute a signaling path for providing visual indications of ringing, busy, or all-paths-busy, to the attendant. The H, TN, and U digits outpulsed by the register sender 82 step the intergroup second selector 1300 and connector (not shown) of switching train 803 which completes the connection to the desired extension.

On the other hand, had the TH digit outpulsed by the register sender stepped intergroup selector 1200 to the level of trunks which includes the trunk over which the call is incoming from the central office, the normal-post spring of the intergroup selector would be operated to return a low resistance ground to the F lead of cable 7011. Relay 7SM would operate and, at its back contact 7SM(8), open the operating path for relay 7S. Operated make contact 7SM(10) partially closes lead S of cable 7080 to lead S2 of cable 6070 and operated make contact 7SM(4) completes the operating path for relay 7SM1. Relay 7SM operated, at its back contact 7SM(6), releases relay 7C0. Relay 7S does not operate in response to the appearance of low resistance ground on lead F because it operates slowly relative to relay 7SM.

Relay 7SM1 operated, at its back contact 7SM1(10), maintains the G– lead 7090 isolated from the E lead of cable 6070. Relay 7SM1 operated, at its transfer contact 7SM1(8), transfers the operating path of relay 7SM to the holding path prepared through the operated contact 7SC(1). Relay 7SM1 operated, at its back contact 7SM1(11), releases relay 7TFS.

Relay 7TFS released, at its back contact 7TFS(6), connects the S2 lead of cable 6070 over the winding of relay 7SC and operated make contact 7SM(10) to the S lead of cable 7080. Relay 7C0 released, at its transfer contacts 7C0(1) and 7C0(3), reconnects leads T2 and R2 of cable 6070 to leads T and R of cable 7080. Relay 7C0 released opens resistance bridge 7SS across the T and R leads of cable 7080. The release of contact 7TFS(12) prevents resistance bridge 7TF from being re-inserted across leads T and R of cable 7011 by the release of contact 7C0(11). The intergroup trunk finder 1100 and associated intergroup selector 1200 at the far end of cable 7011 are thereby released. The incoming selector 800 at the far end of cable 7080 is held by the bridge provided by the register sender across the T2 and R2 leads of cable 6070. The H, TN, and U digits outpulsed by the register sender then re-operate the incoming first selector 800 and the appropriate one of the connectors 804, 804′, 805, 805′.

B. ATTENDANT INTERGROUP SELECTOR 1200 (FIG. 12)

It will be recalled from the description of the block diagram that when the intergroup trunk finder 1100, at the end of cable 1112 remote from the attendant intergroup selector, finds the intergroup transfer trunk 700 marked on the terminal bank of the trunk finder 1100, a path is completed from cable 1112, the wiper and found bank terminal of trunk finder 1100, cable 7011 to the intergroup transfer trunk 700. Resistance bridge 7TF in the intergroup transfer trunk is connected between the T and R leads of cable 7011 and this resistance bridge operates relay 12A (FIG. 12) in the attendant intergroup selector 1200. Relay 12A operated, at its make contact 12A(2), completes an operating ground made available over back contact 12D(2) to operate slow release relay 12B. Relay 12B operated, at its make contact 12B(4), grounds the S lead of cable 1112 to hold the associated trunk finder 1100 and the intergroup transfer trunk 700. Relay 12B operated, at its transfer contacts 12B(2), prepares an operating path for relay 12C and opens the operating path for release magnet 12RL.

When a register sender 82 (FIG. 4) is connected to the loop circuit 25, the 7TF resistance bridge is removed from the T and R leads of cable 7011 and relay 12A is maintained operated by the pulsing contacts of the sender. As the sender outpulses, the pulsing contacts open and close. Relay 12A follows the interruptions of the pulsing contacts. On the first release of relay 12A, relay 12C and the vertical magnet 12VERT are operated. The operating path may be traced from ground, back contact 12D(2), the back contact of transfer contacts 12A(2), and the make contact of transfer contacts 12B(2) to the serially connected windings 12B and 12VERT. The vertical magnet 12VERT follows the operations of relay 12A and steps the selector wipers 12W to the level dictated by the number of times relay 12A is released. Relay 12A releases and re-operates in step with the number of register sender pulses transmitted to represent the TH digit of the desired extension.

Relay 12C operated, at its make contact of transfer contacts 12C(3), completes an operating ground made available over make contact 12B(4) to the winding of relay 12F which operates. On the first vertical step of the shaft (not shown) which drives wipers 12W, vertical off-normal springs 12VON operate preparing operating paths to the release magnet 12RL and relay 12E, respectively. Relays 12B and 12C are slow in releasing and hold during pulsing. Relay 12F is slow in releasing so that at the make contact of its transfer contacts 12F(6) a signaling path is provided between one of leads G1 through G4 and F of cable 1112 to the trunk finder 1100. Rotary hunting of the attendant intergroup selector 1200 is delayed because the operating path to the rotary magnet 12ROT is not completed until back contact 12F(2) is restored to normal by the release of relay 12F. The slow release of relay 12F, therefore, delays rotary hunting so that it will not begin if the operation of the intergroup transfer trunk 700 occurring during the slow release time of relay 12F determines (in response to the signal furnished it on the F lead) that the attendant intergroup selector circuit will not be required to select a trunk.

This may be more particularly demonstrated by way of example. Assume that lead G1 of cable 1112 was grounded when the associated trunk finder 1100 at the remote end of cable 1112 found the associated intergroup transfer trunk. At the completion of vertical stepping one of normal-post springs 12LF, 12RF, 12LR, or 12RR will be operated. If normal-post spring 12LF is operated, the ground appearing on lead G1 is applied over the make contact of normal-post spring 12LF, back contact 12C(2), and the still-operated make contact 12F(6) to the F lead of cable 1112. The intergroup transfer trunk 700, as described above, releases in response to a low resistance ground applied to the F lead. The release of the intergroup transfer trunk releases the intergroup selector 1200 and the associated trunk finder 1100. On the other hand, assuming lead G1 to have been grounded as before, at the completion of vertical stepping, normal-post spring 12RF may have been operated. Normal-post spring 12LF remains nonoperated and extends ground over its back contact in series with resistor 12AR, back contact 12C(2), and still-operated make contact 12F(6) to the F lead. As described above, the intergroup transfer trunk 700 in response to resistance ground appearing on the F lead holds the trunk finder 1100 and intergroup selector 1200. Accordingly, when the G lead that is grounded is associated with an operated normal-post spring, the level to which the attendant intergroup selector has been stepped is the level of the same inputs to the switching train multiple 80113 as are selectable by the re-operation of the incoming selector 800 for that switching train. This incoming selector 800 is therefore re-operated by the H digit keyed by the attendant. On the other hand, when the G lead that is grounded is associated with a nonoperated normal-post spring, the level to which the attendant intergroup selector has been stepped is the level of a different input to a switching train multiple 80313 than that which can be reached by re-operation of the incoming first selector 800. In this case, the attendant intergroup selector circuit will have to rotary hunt for an idle one of local second selectors 1300 having access to the switching train multiple 80313.

When relay 12F releases, ground is extended over back contact 12F(2) and operated make contact 12E(3) to operate rotary magnet 12ROT. The operation of the rotary magnet steps wipers 12W to the first set of terminals on the selected level. Magnet 12ROT operated, at its back contact 12ROT(1), opens the operating path for relay 12E which releases. Relay 12E released, at its contact 12E(3), opens the operating path for rotary maget 12ROT which releases. If the first set of terminals are busy, the sleeve lead S thereof will be grounded. Ground appearing on lead S is applied over back contact 12D(10) to the right-hand side of the winding of relay 12D. Since the left-hand side of this winding is grounded, relay 12D remains unoperated. However, the ground is applied over back contact 12ROT(1) of the released rotary magnet to re-operate relay 12E. The re-operation of relay 12E again allows the rotary magnet 12ROT to be energized and this operation continues until an idle sleeve terminal is reached at which time no ground appears on the sleeve terminal. Relay 12D operates to battery in series with the winding of relay 12E. Relay 12E being marginal does not operate. Relay 12D operated, at its transfer contacts 12D(4) and 12D(7), cuts through contacts 12D(4), 12D(7), 12D(10) and 12D(12), cuts through the T, R, S, and F leads to the called trunk and releases relay 12A. Relay 12A released, at its back contact 12A(2), prepares an operating path for release magnet 12RL. The right-hand side of relay 12B is removed from the sleeve lead by the operation of contact 12D(10) so that when ground is returned by the bridged relay of the local second selector 1300, relay 12D will not be inadvertently released. Relay 12B, which is slow release, remains operated for a short interval to insure that ground is maintained on the S lead of cable 1112 until the bridged relay in the local second selector 1300 operates over the loop and returns a ground over the S lead. If all the terminals on a level are busy, wipers 12W are stepped to the eleventh rotary position and the eleventh rotary step springs 12RS11 are operated. Operation of springs 12RS11 transfers the normally grounded side of the upper winding of relay 12A to a ground provided ringing circuit which superimposes busy tone thereover. Operation of springs 12RS11 prevents the operation of relay 12D by removing ground from the left-hand side of its winding. Operation of springs 12RS11 also connects the interrupter circuit to connect 120 IPM ground to the F lead of cable 1112.

C. INCOMING TRUNK CIRCUIT 600 (FIG. 6)

The incoming trunk 600 shown in FIG. 6, except for the provision of the circuitry associated with the A, B, C, D, and E leads of cable 6070, is described in detail in the above-mentioned copending applications of O. H. Williford and V. J. Matthews. In order that the operation of the 60A relay whose contacts control these leads may be more clearly understood, the over-all operation of incoming trunk circuit 600 will be briefly summarized.

The central office at the remote end of cable 16 seizes the tip and ring leads and transmits dial pulses which are applied over cable 6070 and the intergroup transfer trunk to an associated incoming first selector 800. The operated one of connectors 804, 804′, 805, 805′ gives reverse battery supervision when the called extension answers. In response to answer supervision, the repeat coil bridge 6BR is inserted supplying battery and ground to the incoming call and a low resistance bridge to the called end for supervision and control. If the called extension desires to have the call transferred to another extension, the called extension flashes the switchhook of his telephone. Relays 6P and 6PA release in sequence. When the switchhook is restored after the flash, relay 6W is released and relay 6Z is operated. These relays provide an operating path for relay 6GT which operates under the control of the call distribution circuit 23 (FIG. 4). With the 6GT relay operated ground is applied to the G– lead of cable 6023 which selects an idle trunk finder-position finder pair 26–27 and starts the trunk finder and position finder looking respectively for the trunk and for an idle attendant loop for the PBX customer to whom the incoming trunk 600 is assigned. When the incoming trunk 600 and a selected attendant loop 25 are connected through the trunk and position finder linking path 26, 28, 27, relay 6SK is operated by a ground applied over lead SC of cable 6026. Relay 6SK operated releases relay 6GT and completes an operating path to the winding of relay 6TR. This path may be traced from ground, back contact 6SW(2), make contact 6SP(7), make contact 6Z(8), and make contact 6SK(1) to the winding of relay 6TR. Relay 6TR operated breaks the continuity of the tip and ring leads between cable 16 and cable 6070 and transfers the respective tip and ring leads to cable 6026. The continuity of these leads is then under the control of the selected position loop 25. In the position loop a "B" inductor bridge maintains continuity across leads T and R, cable 6026 keeping relay 6P operated. When the attendant answers the call by depressing the LOOP key at her console 5–8, ground is returned to the trunk circuit on lead TR of cable 6026 operating relay 60A. Relay 60A operated releases relay 6Z. Relay 60A operated, at the make contact of its transfer contacts 60A(3), connects together the F lead of cable 6026 (which is now connected to the attendant loop 25) to the F2 lead of cable 6070 (which is connected to the incoming first selector 800 associated with the transferring station). Relay 60A, at the make contact of its transfer contacts 60A(2), connects together the SC lead of cable 6026 and the S2 lead of cable 6070. At its back contacts 60A(1) and 60A(10), relay 60A removes ground from the OA and OL leads, respectively, of cable 6080 to the incoming first selector 800 associated with the transferring extension.

Relay 6Z released, at its contact 6Z(2), removes audible tone from the incoming trunk. Three-way conversation may now take place between the calling party at the remote end of cable 16, the attendant at the remote end of cable 6026, and the transferring extension at the remote end of cable 6070. As a result of this conversation the attendant is given sufficient information to enable her to ascertain the number of the desired extension. The transferring extension at the remote end of cable 6070 may hang up or he may be released by the attendant depressing the release-forward key (RLS–FWD shown at FIG. 5 of the above-mentioned application) at her console 5–8. However, before this occurs, and simultaneously with the operation of relay 60A, ground is applied by make contact 60A(1–1) to the E lead of cable 6070. The C and D leads of this cable are connected together by make contact 60A(9) and the continuity between the A and B leads of this cable is interrupted by back contact 60A(4). As indicated in the description of the intergroup transfer trunk 700, supra, the operation of back contact 60A(4) between the A and B leads isolates the incoming first selector 800 at the remote end of lead S of cable 7080 from the S2 lead of cable 6070. The significance of this will hereinafter be explained more fully. Make contact 60A(9) in connecting together the C and D leads of cable 6070 extends resistance battery to the S lead of cable 7011, at the remote end of which cable the intergroup transfer trunk finder 1100 is located. Contact 60A(1–1) in extending a ground to the E lead of cable 6070 enables the intergroup transfer trunk 700 to ground its associated G– lead 7090 to the intergroup transfer trunk finder subgroup circuit 900–.

It will be recalled in the above-mentioned Williford and Matthews applications that when an attendant loop 25 is selected, ground is applied by the selected attendant loop to the SC lead of cable 6026 so that relay 6SK may be operated to inform the incoming trunk 600 of the selection of an attendant loop. The ground on the SC lead is removed by the attendant loop circuit when the attendant answers the call, and the SC lead is connected to one end of the winding of the attendant loop "SC" relay (not shown), the other end of which relay is connected to battery. Simultaneously with the attendant answering the call, lead TR of cable 6026 is grounded to operate relay 60A. The make contact of transfer contacts 60A(2) extends the SC lead of cable 6026 to the S2 lead of cable 6070. The "SC" relay in the attendant loop is provided to indicate to the attendant loop circuit that an incoming first selector or hunting connector (accessible over switching train multiple input 80113 or 80313, as the case may be) is available to receive the digits to be outpulsed by the register sender 82. However, operated back contact 60A(9) prevents the "SC" relay in the attendant loop from being operated by the ground supplied to the S lead of cables 7080 and 6070 by the still-operated connector of the switching train.

When the switching train to the transferring extension is released (either by the transferring extension restoring his switchhook to normal or the attendant operating her release-forward key), ground is removed from the S lead of cable 7080. The attendant then attaches a register sender 82 via her attendant loop 25 to operate an attendant intergroup selector 1200. Relay 12A of the intergroup selector 1200 is operated by the pulsing bridge of the register sender 82 and, in turn, operates relay 12B whose make contact 12B(4) grounds the S lead of cable 1112. This ground appears at the S lead of cable 7011 and is forwarded over make contacts 7TFS(1) and 7TFS(6) to the S2 lead of cable 6070. Ground applied to the S2 lead of cable 6070 appears on the SC lead of cable 6026 operating the "SC" relay of the attendant loop. Ground is re-applied to the S lead of cable 7080 by the associated incoming selector 800 only if that selector is seized as the result of corresponding normal-post springs being operated in the attendant intergroup trunk finder 1100 and the intergroup selector 1200. In this case, marginal relay 7SM in the intergroup transfer trunk is operated releasing relay 7C0 whose back contacts provide a continuous path from the pulsing bridge of the register sender to re-operate relay 8A of the incoming selector 800. Relay 8A re-operated re-operates relay 8B which grounds the S lead of cable 7080. The ground is continued over make contact 7SM(10), back contact 7TFS(6) to the S2 lead of cable 6070 and re-appears on the SC lead of cable 6026 to maintain the "SC" relay of the attendant loop operated.

D. SUBGROUP 900– AND GROUP 1000 CIRCUITS (FIGS. 9–10)

Figure 2:
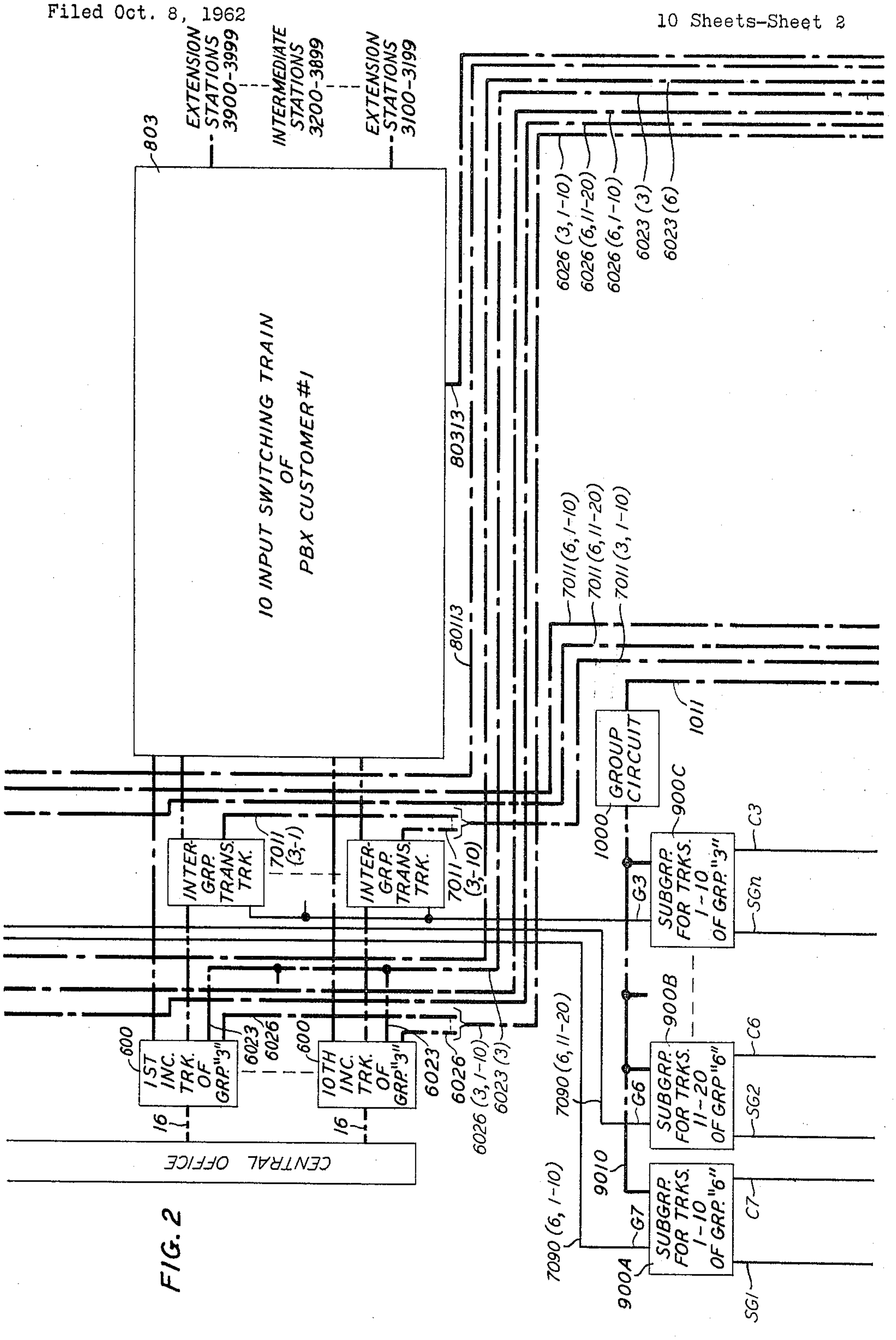

The subgroup circuits 900– and the group circuit 1000 are used to start the intergroup trunk finders 1100 hunting for intergroup transfer trunks. When an intergroup transfer trunk 700 grounds its G– lead 7090, it operates its associated 9G– relay of the subgroup circuit 900–. Conveniently, as many as ten intergroup transfer trunks 700 may have their G– leads associated with the same 9G– relay of a subgroup circuit. For example, subgroup circuit 900A of FIG. 2 is shown associated with the first ten intergroup transfer trunks of FIG. 1, while subgroup circuit 900B is shown associated with the second ten intergroup transfer trunks of FIG. 1.

Operation of relay 9G–, at its make contact 9G–(3), connects the G lead of cable 910 to the SG– lead of the associated trunk finder 1100. Ground is applied to the G lead of cable 9010 over back contact 10–OB(2) of the group circuit. Operation of subgroup relay 9G–, at its make contact 9G–(2), extends ground to the C– lead of the associated trunk finder 1100 to mark its commutator segment which corresponds to the bank level upon which appear the ten trunks associated with the subgroup circuit. The ground on the SG– lead operates relay 11A in the associated trunk finder (assuming that finder to have been idle).

If the series start lead SG– is crossed with ground, each trunk finder will be started in succession and will step over it terminal banks hunting for an unmarked sleeve, and release. However, the 11D relay in each finder will remain held over its secondary winding to battery on the CI lead and ground on the SG– lead. When all the finders have been operated and all the 11D relays have been operated, continuity is broken between the A and B leads of cable 1011 because back contacts 11D(3) and 11D(4), which normally maintain leads A and B of cable 1011 continuous, have been operated. Relays 10S and 10CH, accordingly, release and complete a path from ground, over their back contacts 10CH(2) and 10S(1), to the winding of relay 10–OB which operates. Relay 10–OB, at its back contact 10–OB(2), removes ground from the G lead of cable 9010 preventing all of the subgroup circuits from grounding their respective SG– leads. Make contact 10–OB(5) connects the grounded start lead to operate relay 10GD. Relay 10GD, at its contact 10GD(2), operates relay 10CI which removes battery from all the CI leads, thus releasing all the 11D relays in the finders 1100 except the last one which is operated on its primary winding from the ground supplied over the 11VON off-normal springs. The release of relay 11D restores continuity between leads A and B of cable 1011, thereby re-operating relays 10S and 10CH, and in turn releasing relay 10–OB. The release of relay 10–OB allows relay 10GD to release which releases relay 10CI and restores battery to the CI lead and the secondary winding of the D relays. If the start lead is still grounded, the cycle will be repeated. However, any intergroup transfer trunk requesting service will operate its 9G– relay and its associated C– lead to allow marking of a trunk finder commutator. The alarm will remain locked in, however, until released by a serviceman responding to operate the AR key. A relay is provided in circuit 10 in series with each of the A and B leads of cable 1011 so that if either lead becomes crossed by either battery or ground, one relay will release while the other remains operated. Either of these conditions will cause lamp C to be lighted indicating the trouble condition.

When all finders 1100 are busy, all the 11D relays will be operated and the multiple chain circuit between the A and B leads of cable 1011 will be broken causing relays 10S and 10CH to release and relay 10–OB, in turn, to be operated. Relay 10–OB, at its make contact 10–OB(5), connects the winding of relay 10GD to the SG– lead. However, the 10GD relay does not operate since all 9G– relays are released. When a finder becomes idle the multiple chain circuit between the A and B leads of cable 1011 will be restored allowing relays 10S and 10CH to operate which in turn releases relay 10–OB.

E. TRUNK FINDER 1100 (FIG. 11)

When the attendant answers the call, the intergroup transfer trunk, as described above, connects resistance battery to the sleeve terminal of its appearance on the bank of an associated trunk finder 1100. The intergroup transfer trunk also causes its associated subgroup circuit 900– and the group circuit 1000 to function. When the associated subgroup circuit 900– operates, the SG– lead is grounded. The SG– lead from the subgroup circuit is connected to the start-in terminal SI of the preferred trunk finder for the particular subgroup circuit 900–. (If the preferred trunk finder 1100 is busy a path is provided from the start-in terminal SI over make contact 11D(10) and back contact 11E(10) to the start-out terminal SO. The start-out terminal SO is wired to the start-in terminal SI of the next-preferred one of the trunk finders 1100, as shown in FIG. 3.)

The grounding of the SG– lead of an idle trunk finder causes that trunk finder's relay 11A to be operated. The associated subgroup circuit 900– grounding its C–commutator lead causes ground to be applied to a corresponding commutator segment such as one of the segments shown connected to leads C3 through C7 at the right-hand side of FIG. 11. The grounded commutator segment indicates the level on the bank of the trunk finder 1100 at which the intergroup transfer trunk, whose sleeve terminal exhibits resistance battery, appears. As indicated in FIG. 3, the commutator and bank wiring of the trunk finders 1100 are slipped or graded between finders so that a subgroup of intergroup transfer trunks appearing on the first level of a particular finder also appears on the next higher (or next lower) level in the next adjacent finder, etc. Accordingly, the trunk finder 1100 on which a particular subgroup appears on the lowest level is the preferred trunk finder for that subgroup.

When relay 11A is operated, ground is extended over back contacts 11VERT and 11ROT(1) to the lower winding of relay 11C and back contact 11D(2) to battery. Relay 11C operates and extends ground provided over make contact 11A(4), over make contact 11C(1), and back contact of transfer contacts 11E(6) to the winding of magnet 11VERT and back contact 11D(2) to battery. Magnet 11VERT operates and steps the wipers 11W and 11CC vertically one level. Magnet 11VERT operated opens the ground operating path to the lower winding of relay 11C and relay 11C releases. Relay 11C in releasing at its contact 11C(1) removes the operating ground from the winding of magnet 11VERT which in turn releases. Magnet 11VERT released restores the operating ground to the winding of relay 11C which re-operates. Wipers 11W and 11CC continue to be stepped vertically until wiper 11CC makes contact with a grounded commutator segment at which time relay 11E is operated. This operating path for relay 11E may be traced from ground on the commutator segment, wiper 11CC, the lower winding of relay 11E, back contact 11ROT(1) of the rotary magnet, the lower winding of relay 11C, back contact 11D(2) to battery. Relay 11C and the vertical magnet 11VERT hold in the operated position and further vertical stepping is prevented. Relay 11E is slow operating to provide a short interval of time between the last vertical step and the first rotary step to allow vibrations to subside.

When relay 11E operates, its contact 11E(2) opens and then its contact 11E(3) closes in preparation for holding relay 11E through its upper winding in series with the vertical magnet. This hold path is enabled when the back contact of transfer contacts 11E(6) opens, removing the short circuit around the upper winding of relay 11E. The vertical magnet, which is now in series with the winding of relay 11E, does not obtain sufficient current and releases. The make contact of transfer contacts 11E(6) completes an operating path to the winding of rotary magnet 11ROT. Rotary magnet 11ROT operates and rotates wiper 11W one rotary position. Magnet 11ROT operated, at its back contact 11ROT(1), opens the operating ground to the lower winding of relay 11C which releases. Relay 11C released releases the rotary magnet 11ROT which restores the operating path to the winding of relay 11C. Relay 11C re-operated, at its make contact 11C(1), restores the operating path to rotary magnet 11ROT.

This sequence continues until the sleeve of wiper 11W finds resistance battery on the sleeve terminal of the intergroup transfer trunk. Relay 11F operates to the resistance battery at its upper winding. The operating path may be traced from ground, make contact 11A(6), the upper winding of relay 11C, the back contact of transfer contacts 11D(6), diode 11AD, the upper winding of relay 11F to resistance battery. Relay 11C is held operated preventing further rotary stepping. Relay 11F locks to ground over its make contact 11F(1) in series with make contacts 11ROT(4) and 11A(6). Relay 11F operated, at its make contacts 11F(9) and 11F(11), closes through the tip and ring conductors of cable 7011 from the intergroup transfer trunk to cable 1112 of the attendant intergroup selector 1200. Make contact 11F(7) operates and short-circuits the upper winding of relay 11F. The make contact of transfer contacts 11F(4) completes an operating ground over the make contact of the vertical off-normal springs 11VON to the upper winding of relay 11D. The continuity of the tip and ring leads to cable 1112 causes the associated attendant intergroup selector 1200 to operate. Selector 1200 in operating applies ground to the S lead of cable 1112 which supplements the operating ground provided over make contact 11A(6). Relay 11D operated, at its make contact 11D(6), connects through the sleeve lead from the intergroup transfer trunk at the remote end of cable 7011 to the sleeve lead of the attendant intergroup selector at the remote end of cable 1112. Contact 11(D)8 operated supplements the locking path to the lower winding of relay 11F. Back contact 11D(4) opens the multiple chain circuit leads A and B to group circuit 1000 at the remote end of cable 1011. One make contact of transfer contacts 11D(10) prepares a path to transfer the continuity of the SG– lead at the start-in terminal SI to the start-out terminal SO. The other make contact of transfer contacts 11D(10) extends the continuity of the SG– lead from the start-in terminal SI to the lower winding of relay 11D. The other end of the lower winding of relay 11D is connected to the CI lead of cable 1011. Back contact 11D(2) operating removes battery from the lower winding of relay 11C and from the upper winding of relay 11E causing relays 11C and 11E to release. Relay 11E releasing, at its back contact 11E(10), completes the extension of the continuity of the SG– lead from the start-in terminal SI to the start-out terminal SO.

The lower winding of relay 11D is connected to the CI lead of cable 1011 associated with group circuit 1000 which normally applies battery to the CI lead under control of back contact 10CI(1). In the event that a trunk finder 1100 is started by the application of ground to its start-in terminal SI but no sleeve terminal is marked with resistance battery, relay 11A will operate causing the wipers 11W and 11CC to vertically step until they have reached a grounded commutator segment or the last commutator segment which is permanently grounded. Wipers 11W then rotary hunt but fail to find a marked sleeve terminal. Springs 11RS10 operate causing relay 11A to release. Relay 11A released, at its back contact 11A(2), extends ground over contacts 11VON to the windings of relay 11D and the release magnet 11RL. Release magnet 11RL operates restoring wipers 11W and 11CC to their rest position. Relay 11D operated locks to the ground provided at the start-in terminal SI and transfers that start-in ground to the start-out terminal SO.

The next finder in the chain of finders 1100 then executes the same operation, and so on. When the last finder is being operated in this manner and its relay 11D is operated by the release of its 11A relay, the chain relays 10S and 10CH in the group circuit 1000 release causing the operation of all back contacts 11D(4) which removes continuity between the A and B leads of cable 1011. The release of relays 10S and 10CH completes an operating path for relay 10–OB which removes ground from the SG– lead. All the finders, which have their relays 11D locked to the ground appearing on the SG– lead, release. The 11D relay of the last finder holds operated over the make contact of the vertical off-normal springs 11VON until the operation of its release magnet 11RL has restored wipers 11W and 11CC to normal.

After the removal of ground from the SG– lead, the release of the first 11D relay, at its back contact 11D(4), restores continuity between the A and B leads of cable 1011 causing relays 10CH and 10S in group circuit 1000 to re-operate to release relay 10–OB. Ground is restored by the release of relay 10–OB to the SG– lead (provided a subgroup relay 9G– is operated). This ground will be applied before the make contact of vertical off-normal springs 11VON of the above-mentioned last finder is restored to normal so that the 11D relay of this last finder will remain operated to the ground appearing at its start-in terminal SI when the wipers are restored to their normal position.

Assuming, however, that the trunk finder 1100, which was started into operation by the grounding of its start-in terminal SI, has raidsed its wiper 11CC to the grounded commutator segment indicated by one of the C– leads of the subgroup circuits 900– one of normal post springs 11LF, 11RF, 11LR, and 11RR associated with the leads G1 through G4 of cable 1112 will be operated. Since there are four such normal-post springs shown, the trunk finder 1100 may discriminate between four different switching trains belonging to the same telephone customer. In the illustrative embodiment, it has been assumed that PBX customer No. 1 has thirty incoming trunks 600, twenty of which are assigned to the switching train 801 (FIG. 1) and ten of which are assigned to the switching train 803 (FIG. 2). The intergroup transfer trunks 700 associated with each of the trunks 600 appear via their cables 7011 on the banks of trunk finders 1100. The normal-post springs 11LF, 11RF, 11LR, and 11RR are adjusted so that the 11LF normal-post spring shall be operated on the two levels of the bank of trunk finders 1100 upon which appear the twenty incoming trunks 600 associated with switching train 801. The 11RF normal-post spring is adjusted to operate on the level at which the intergroup transfer trunk 700 assigned to switching train 803 appears on the bank of trunk finder 1100. The 11LR and 11RR normal-post springs would be employed to indicate the level of intergroup transfer trunks 700 that were assigned to other independent switching trains of PBX customer No. 1 if that customer had need for more than two independent switching trains 801 and 803, which have been illustrated. Accordingly, when any of the twenty intergroup transfer trunks associated with switching train 801 are found, lead G1 of cable 1112 is grounded. When any of the intergroup transfer trunks 700 of switching train 803 are found, lead G2 of cable 1112 is grounded. Thereafter, when the number of the desired extension is outpulsed, the grounded one of leads G1 through G4 may be compared with the operated normal-post springs 12LF, 12RF, 12LR, and 12RR of the attendant intergroup selector which applies a low resistance ground to the F lead of cable 1112 when corresponding normal-post springs of the trunk finder 1100 and the intergroup selector 1200 are operated, and which applies high resistance ground to the F lead when noncorresponding normal-post springs are operated.

F. INCOMING SELECTOR CIRCUIT 800 (FIG. 8)

The incoming first selector circuit 800 is seized by an incoming trunk 600 over the tip and ring path through the intervening intergroup transfer trunk 700 on an incoming call. Relay 8A is operated by the central office calling bridge and in operating, at its make contact 8A(2), operates slow release relay 8B. Relay 8B operated, at its make contact 8B(4), applies ground to the S lead of cable 7080. The ground applied to the S lead of cable 7080 is continued along the A lead of cable 6070 to the incoming trunk 600 where it is returned over back contact 60A(4) to the B lead of cable 6070, back contact 7TFS(6), and the winding of relay 7SC of the intergroup transfer trunk 700 to the S2 lead of cable 6070. The ground at this time, however, is not employed by the incoming trunk circuit 600.

The incoming first selector is operated in accordance with the dial pulses of the H digit transmitted by the central office. Assuming one of the digits 1 through 9 is transmitted, the wipers 8W step to the corresponding level and hunt across the terminals on that level to choose an idle one of the connectors 804, 804′, 805, 805′ which may appear on that level. The selected hunting connector is then operated in accordance with the TN and U digit of the first extension station's number and a communications path is established through the switching train, as described in the above-mentioned application of O. H. Williford and V. J. Matthews. At this time relays 8A and 8B are released and relay 8D holds to the ground applied to the S lead that is returned by the connector. The called extension may thereafter desire to have the call transferred to a new extension and depresses his switchhook for a brief interval. This is called a switchhook flash and is permitted only for a short interval to enable the incoming trunk 600 to distinguish it from a permanent on-hook signal. In response to the switchhook flash, the incoming trunk initiates a sequence of operations which transfers the T, R, S and F leads of cable 7080 to the attendant loop circuit. The attendant loop circuit applies a polarized bridge across the T1 and R1 lead of cable 6026 (FIG. 6) whose operating path may be traced over make contacts 6TR(8) and 6TR(9), the T2 and R2 leads of cable 6070, to the T and R leads of cable 7080. This bridge is poled to provide a low impedance path for the battery and ground returned by the conductor to the T and R leads of the switching train and to provide a high impedance path for the battery and ground that can be applied through the windings of relay 8A. The attendant answers the call and converses with the calling party and with the transferring party. The transferring party may then hang up removing ground from the S lead of the switching train and releasing relay 8D and incoming selector 800.

On the other hand, if the transferring extension fails to disconnect, the attendant may depress her release-forward key RLS–FWD, the effect of which is momentarily to remove the polarized bridge from the T and R leads of cable 7080. This causes the connector to release which, in turn, removes ground from the S lead causing the incoming selector to release. When the RLS–FWD key is released and the polarized bridge is restored, it is poled so as to oppose the battery and ground provided over the windings of relay 8A and relay 8A is not operated. Relay 8A is operated, however, when register sender 82 is connected to the attendant loop because register sender 82 effectively applies a pulsing bridge across the T and R conductors of cable 7080. Relay 8A re-operated operates relay 8B whose contact 8B(4) grounds the S lead of cable 7080. This ground is continued to the SC lead of cable 6026 to operate the "SC" relay (not shown) in the attendant loop indicating to the attendant that an incoming first selector has been connected and is available for extending a communications connection to the desired extension station.

It is to be understood that the above-described arrangements are illustrative of the application of the principles of the invention; numerous other arrangements may be devised by those skilled in the art without departing from the spirit and scope of the invention.

What is claimed is:

1. A switching train control apparatus comprising a first and at least a second inward switching train each having a respective plurality of incoming trunks and associated first selectors, each said respective plurality constituting a group, each said switching train further including a plurality of connectors for extending telephone calls to extension stations, an intergroup transfer trunk connected between each said incoming trunk and its associated first selector, a group of intergroup selectors each having an input to one of said intergroup transfer trunks and an outlet to each of said connectors, means for pulsing numbers of said extension stations out of said incoming trunks and into said intergroup transfer trunks, means for initially conditioning said intergroup transfer trunk to apply said numbers outpulsed to said intergroup selector, and means thereafter controlled by said intergroup selector for selectively applying said numbers outpulsed to said connectors.

2. A switching train control apparatus according to claim 1 wherein said outpulsed numbers are applied by said thereafter-controlled means through one of said associated first selectors.

3. A switching train control apparatus according to claim 1 wherein said inputs of said group of intergroup selectors are selectively connectable with any of said intergroup transfer trunks.

4. In a private branch exchange telephone switching system having a plurality of switching trains and attendant loop circuits connectable with the incoming trunks of said switching trains, means for permitting any of said loop circuits connected to an incoming trunk of one of said switching trains to control another of said plurality of switching trains comprising selector circuit means associated with said incoming trunks, an auxiliary input to the intermediate multiple of each of said switching trains, said selector circuit means being operable in accordance with a digit of an extension station telephone number transmitted by said loop circuits to select one of said auxiliary inputs and thereafter providing a communications path from said incoming trunk over the selected auxiliary input of the intermediate multiple of said another of said switching trains.

5. In a private branch exchange system according to claim 4, the combination further comprising means operative when said auxiliary input selected is the auxiliary input to said one switching train to release said selector circuit and to thereafter provide a communications path from said incoming trunk over said one switching train.

6. In a private branch exchange telephone switching system having a plurality of switching trains and attendant loop circuits connectable with the incoming trunks of said switching trains, means for permitting any of said loop circuits connected to an incoming trunk of one of said switching trains to control another of said plurality of switching trains comprising selector circuit means associated with said incoming trunks, an auxiliary input to the intermediate multiple of each of said switching trains, said selector circuit means being operable in accordance with a digit of an extension station telephone number transmitted by said loop circuits to select one of said auxiliary inputs, mean providing distinctive markings for said incoming trunks and auxiliary inputs, means for comparing said markings of said incoming trunks and said auxiliary input selected in accordance with said digit and means controlled by said comparing means and including said selected auxiliary input for completing a communications path over said another of said switching trains.

7. A telephone system comprising a plurality of trunks and extension stations, a plurality of switching paths for establishing connections between predetermined ones of said trunks and respective ones of said stations, means for initiating in any of said paths a call transfer condition, means for obtaining the telephone number of the station to which the transfer is destined, means responsive to said initiating means for identifying the path exhibiting said transfer condition, means responsive to said obtaining means for identifying a path respective to said station, and means controlled by said identifying means for operating said exhibiting path when the identifications match and for operating said respective path when the identifications fail to match.

8. A multicustomer private branch exchange having a plurality of trunks, a plurality of extensions and a plurality of attendants' loop circuits, predetermined groups of said trunks, extensions and attendant loop circuits being unique to different customers of said private branch exchange, switching means for each of said customers, means common to said different customers' trunks, extensions and loop circuits for operating said switching means selectively to interconnect each of said customers' trunks, extensions and attendant loop circuits, said multicustomer private branch exchange being characterized by an auxiliary input multiple individual to each of said switching means, means for selecting one of said auxiliary input multiples, and means controlled by said common means for operating said selecting means.

9. A multicustomer private branch exchange in accordance with claim 8 wherein said controlled means includes means for finding one of said customer's trunks, first means for identifying the group of customer's trunks in which said one trunk is located, second means for identifying the group of trunks corresponding to said selected auxiliary multiple, and means controlled by said first and second identifying means for selectively interconnecting said one trunk and said auxiliary multiple.

10. A multicustomer private branch exchange in accordance with claim 8 wherein said switching means includes a selector circuit individual to each of said trunks, said selector circuit initially being operated in accordance with an extension number incoming over said individual trunk, said common means being operable to release said selector under the control of a connected one of said attendant loop circuits, and wherein said means for selecting said one of said auxiliary multiples includes means for temporarily reseizing said released selector.

11. In a private branch switching system having a plurality of trunks incoming thereto and groups of extension stations individually identifiable by a common digit of their telephone numbers, a switching train for each of said groups of said extension stations, each said switching train having a number of multiple paths for simultaneously maintaining connections between a corresponding number of said incoming trunks and of said extensions, means for extending a call from any of the group of trunks incoming only to a first of said switching trains to an extension terminating only a second of said switching trains, comprising means for associating with said trunks incoming to said first switching train the multiple paths of each of the other of said plurality of switching trains, said multiple paths being arranged in said associating means according to their respective ones of said common telephone number digits, and means for pulsing the telephone number of said terminating extension over said associating means.

12. In a private branch switching system according to claim 11, the combination wherein said means for pulsing includes an attendant loop circuit selectively connectable to said group of trunks incoming only to said first of said switching trains.

13. In a private branch switching system according to claim 11, the combination wherein said call extending means includes means for transferring a call to any extension terminating only said first of said switching trains.

14. In a private branch switching system according to claim 13, the combination wherein said associating means includes means for operating said first of said switching trains in accordance with the telephone number of said extension terminating said first of said switching trains.

15. In a multicustomer telephone switching system having a number of independent switching branches for connecting groups of incoming trunks to corresponding groups of telephone stations, means for maintaining the operation of each of said trunk groups independent of the operation of the others of said trunk groups throughout the continuance of the extension of a call from a trunk of one of said switching branches to a telephone station of a different one of said switching branches comprising means for selecting a point of said one of said different switching branches intermediate the trunks incoming thereto and the telephone stations in termination thereof, and means for operating only the portion of said different switching branch between said point and said telephone stations thereof.

16. A multicustomer telephone switching system according to claim 15 wherein the intermediate points of all said switching branches are grouped to be selected in accordance with a telephone number digit characterizing all said telephone stations of said one of said different switching branches.

17. In a telephone system having a first and at least a second incoming trunk, incoming selector, plurality of extension stations and intermediate switching multiple, said first incoming selector and intermediate switching multiple constituting a first group normally operable to connect said first incoming trunk with any of said first plurality of extension stations and said second incoming selector and intermediate switching multiple constituting a second group normally being operable to interconnect said second incoming trunk with any of said second plurality of extension stations, the combination comprising an intergroup trunk circuit normally connecting each said incoming trunk with a respective incoming selector, means controlled by said intergroup trunk circuit for selecting any said intermediate switching multiple, means for comparing the identity of a selected switching multiple with the identity of the switching multiple associated with the selecting one of said intergroup trunk circuits, and means responsive to said comparing means for further controlling said selecting means.

18. In a telephone system according to claim 17, the combination wherein said selecting means is further controlled to release said selected intermediate switching multiple when said first and said second-mentioned identity match and to hold said selected multiple when said first and said second-mentioned identity fail to match.

References Cited by the Examiner

UNITED STATES PATENTS 2,365,996 12/1944 Bakker -------------- 179—27

ROBERT H. ROSE, *Primary Examiner.*

WILLIAM C. COOPER, *Examiner.*